US006815858B2

(12) United States Patent
Matsunobu et al.

(10) Patent No.: US 6,815,858 B2
(45) Date of Patent: Nov. 9, 2004

(54) PERMANENT MAGNET ROTATING ELECTRIC MACHINE

(75) Inventors: Yutaka Matsunobu, Hitachinaka (JP); Fumio Tajima, Juou (JP); Shouichi Kawamata, Hitachi (JP); Takashi Yasuhara, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/245,589

(22) Filed: Sep. 18, 2002

(65) Prior Publication Data

US 2003/0222526 A1 Dec. 4, 2003

(30) Foreign Application Priority Data

May 15, 2002 (JP) ........................................ 2002-140039

(51) Int. Cl.[7] .......................... H02K 21/12; H02K 21/14
(52) U.S. Cl. ........................... 310/156.45; 310/156.53; 310/156.56
(58) Field of Search ................. 310/156.02, 156.07, 310/156.08, 156.38, 156.45, 156.53, 156.56, 156.82–156.84, 156.47

(56) References Cited

U.S. PATENT DOCUMENTS

| | | | | | |
|---|---|---|---|---|---|
| 5,010,266 | A | * | 4/1991 | Uchida | 310/156.22 |
| 5,302,876 | A | * | 4/1994 | Iwamatsu et al. | 310/156.12 |
| 5,962,944 | A | * | 10/1999 | Narita et al. | 310/156.53 |
| 6,229,239 | B1 | * | 5/2001 | Lucidarme et al. | 310/162 |
| 6,252,323 | B1 | * | 6/2001 | Nishikawa et al. | 310/156.01 |
| 6,426,576 | B1 | * | 7/2002 | Varenne | 310/156.09 |
| 2002/0047434 | A1 | | 4/2002 | Koharagi et al. | 310/156.56 |

FOREIGN PATENT DOCUMENTS

| | | |
|---|---|---|
| JP | 09-327140 | 9/1997 |
| JP | 2001-190039 | 7/2001 |

OTHER PUBLICATIONS

European Search Report dated Aug. 4, 2003 w/ attached abstract.

* cited by examiner

Primary Examiner—Tran Nguyen
(74) Attorney, Agent, or Firm—Crowell & Moring LLP

(57) ABSTRACT

A permanent magnet rotating electric machine uses no skewing under a predetermined current and voltage condition to prevent torque from decreasing and to decrease pulsation torque to make the machine less vibrating and less noisy. The permanent magnet rotating electric machine includes a stator with multi-phase stator windings and a rotor with a plurality of permanent magnets internally embedded in a rotor core. The core shape of the rotor is uniform in the depth (longitudinal) direction with no skewing in the arrangement of the permanent magnets. The permanent magnets are symmetrical with respect to the rotation direction, but irregular with respect to the depth direction, for each pole. A magnetic flux generated from the between-pole permanent magnets almost equals a magnetic flux generated from the pole-center permanent magnet.

21 Claims, 15 Drawing Sheets

PERMANENT MAGNET ROTATING ELECTRIC MACHINE

BACKGROUND OF THE INVENTION

The present invention relates to a permanent magnet rotating electric machine that has a rotor built with a plurality of permanent magnets embedded in a rotor core.

A conventional permanent magnet rotating electric machine is disclosed, for example, in JP-A-9-327140. In such a permanent magnet rotating electric machine, the rotor core is fixed on the shaft and the rotor is built by inserting a plurality of permanent magnets, each with a rectangular cross section, from the shaft direction into the storage section formed on the rotor core so that the rotor can rotate with a predetermined gap to the inner periphery of the stator core within the stator. The permanent magnets are magnetized such that the north pole and the south pole alternate.

A motor with rectangular magnets embedded in the rotor, such as the one described above, is efficient during high-speed rotation because field weakening is effective during high-speed rotation. For this reason, the motor is used, for example, as the permanent magnet motor on an electric car where high-speed rotation is required. To avoid vibrations and noises generated during driving, the magnets within the rotor are split in the longitudinal direction to produce semi-slot skews for attaining low-torque pulsation.

The motor torque of a magnet-embedded rotating electric machine such as the one described above is expressed by expression (1) given below.

$$T=\phi Iq+(Lq-Ld)Iq\times Id \qquad (1)$$

where, T is the motor torque, $\phi$ is the magnetic flux of the permanent magnet, Lq is the q-axis inductance, Ld is the d-axis inductance, Iq is the q-axis winding current, and Id is the d-axis winding current.

In expression (1), the first term is the torque of the major magnetic flux of the permanent magnet, and the second term is a reluctance torque generated by the auxiliary magnetic pole of an iron core between two magnets. The magnetic torque has a period for each pole pair (electrical angle of 360 degrees), while the reluctance torque has a period for each pole (electrical angle of 180 degrees).

In this case, if the rotor is skewed as in the prior art example, the maximum torque is decreased because of a difference in the current phase for generating the maximum torque. If the magnet torque is the main torque, the torque decrease is small, for example, about 5% because the magnetic torque has a period of 360 degrees; however, if the reluctance torque is the main torque, the torque decrease is large, for example, about 10% because the reluctance torque has a period of 180 degrees. Thus, for a motor that uses the reluctance torque as the main toque, there has been a need for a shape that reduces torque pulsation with no skewing.

SUMMARY OF THE INVENTION

It is an object of the present invention to provide a permanent magnet rotating electric machine that uses no skewing under a predetermined current and voltage condition to prevent torque from decreasing and, at the same time, decreases pulsation torque to make the machine less vibrating and less noisy.

(1) To achieve the above object, a permanent magnet rotating electric machine according to the present invention comprises a stator on which multi-phase stator windings are provided and a rotor which is built by embedding a plurality of permanent magnets internally into a rotor core and which is rotatably arranged with a predetermined gap to the stator, a core shape of the rotor being uniform in a depth (longitudinal) direction, wherein a plurality of permanent magnets are arranged for each pole of the rotor and wherein the plurality of permanent magnets are symmetrical with respect to a rotation direction but irregular with respect to the depth direction.

This configuration allows a permanent magnet rotating electric machine, with no skewing under a predetermined current and voltage condition, to prevent torque from decreasing and to decrease pulsation torque, thus making the machine less vibrating and less noisy.

(2) Preferably, in (1) described above, there are, for each pole, three or more permanent-magnet-inserting holes through which the permanent magnets are inserted into the rotor.

(3) Preferably, in (1) described above, the ratio of the length of one permanent magnet arrangement to the length of another permanent magnet arrangement in the depth direction of the rotor is 1:1.

(4) Preferably, in (1) described above, $\theta$ satisfies a relation $\theta=(n+0.5)\times\tau s+\phi$ (n is an integer) wherein, for each pole of the rotor, $\theta$ is an angle between between-pole permanent-magnet-inserting holes with its vertex at a center of a shaft, $\phi$ is an angle of a pole-center permanent-magnet-inserting hole with its vertex at the center of the shaft, and $\tau s$ is a slot pitch.

(5) Preferably, in (1) or (4) described above, a magnetic flux generated from between-pole magnets equals a magnetic flux generated from a pole-center permanent magnet for each pole of the rotor.

Other objects, features and advantages of the invention will become apparent from the following description of the embodiments of the invention taken in conjunction with the accompanying drawings.

DETAILED DESCRIPTION OF THE EMBODIMENTS

The configuration of a permanent magnet rotating electric machine in a first embodiment of the present invention will be described below with reference to FIGS. 1–8. In the example below, the present invention is applied to a three-phase, 8-pole/48-slot permanent magnet rotating electric machine.

First, referring to FIG. 1, the general configuration of the permanent magnet rotating electric machine in the first embodiment of the present invention will be described.

Figure 1:
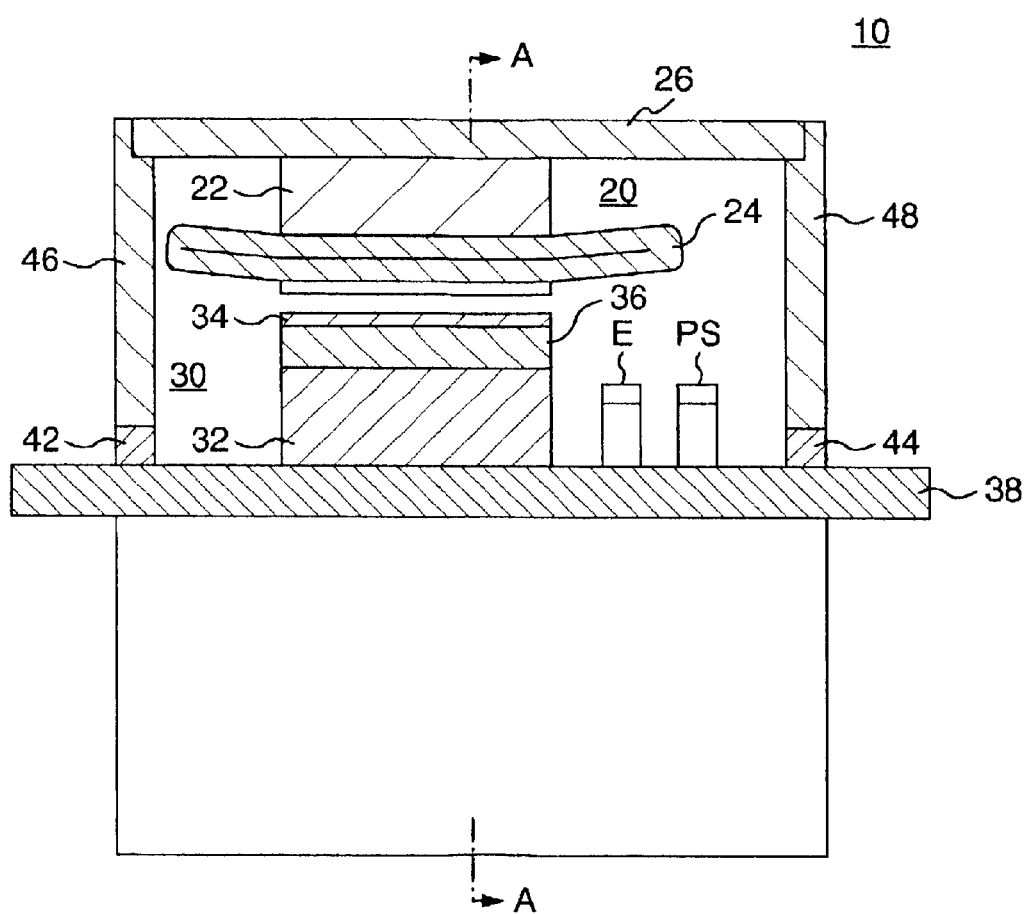
FIG. 1 is a partial cross section, viewed from the front, of a permanent magnet rotating electric machine in a first embodiment of the present invention.

FIG. 1 is a partial cross section, viewed from the front, of the permanent magnet rotating electric machine in the first embodiment of the present invention.

Referring to FIG. 1, a stator 20 of a rotating electric machine 10 comprises a stator core 22, a multi-phase stator winding 24 wound on the stator core 22, and a housing 26 that holds the stator core 22 on the inner periphery side. A rotor 30 comprises a rotor core 32, a permanent magnet 36 inserted into a permanent-magnet-inserting hole 34 provided on the rotor core 32, and a shaft 38. The shaft 38 is held rotatably by bearings 42 and 44. The bearings 42 and 44 are held by end brackets 46 and 48 fixed on the sides of the housing 26.

A magnetic pole position detector PS that detects the position of the permanent magnet 36 of the rotor 30 and an encoder E that detects the position of the rotor 30 are provided to the side of the rotor 30. The rotating electric machine 10 is operated and controlled by a controller, not shown, using signals from the magnetic pole position detector PS and output signals from the encoder E.

Next, referring to FIG. 2, the arrangement structure of the magnets in the permanent magnet rotating electric machine in the first embodiment of the present invention will be described.

Figure 2:
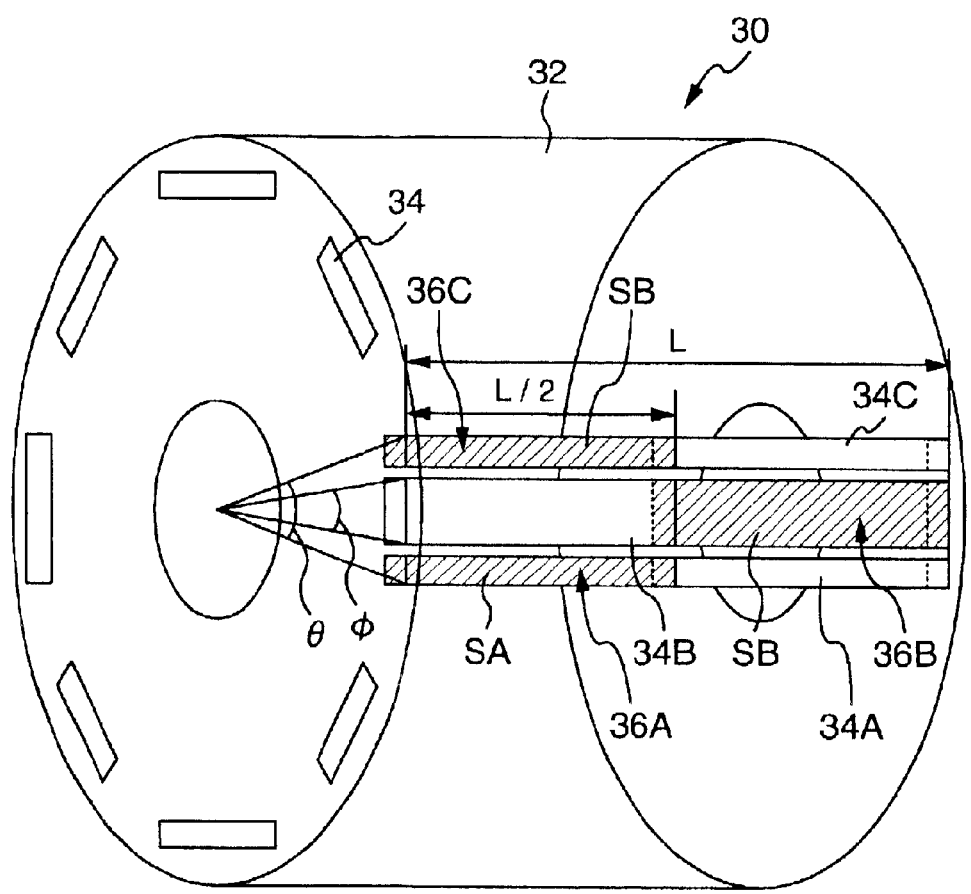
FIG. 2 is a skeleton perspective view in the rotor depth (longitudinal) direction of a rotor, illustrating the magnet arrangement structure in the permanent magnet rotating electric machine in the first embodiment of the present invention.

FIG. 2 is a skeleton perspective view in the rotor depth (longitudinal) direction of the rotor, illustrating the magnet arrangement structure in the permanent magnet rotating electric machine in the first embodiment of the present invention. The same reference numerals as those in FIG. 1 indicate the same structural elements.

A plurality of permanent-magnet-inserting holes 34 are formed in the rotor core 32 of the rotor 30. For a three-phase, 8-pole/48-slot permanent magnet rotating electric machine, eight permanent-magnet-inserting holes 34 are usually provided. However, the permanent-magnet-inserting hole 34 of one pole in this embodiment comprises three permanent-magnet-inserting holes, 34A, 34B, and 34C, as shown in the figure. Although the three permanent-magnet-inserting holes 34A, 34B, and 34C, are shown for only one pole in the figure for convenience of illustration, the permanent-magnet-inserting hole 34 of each of the other poles also comprises three permanent-magnet-inserting holes. The permanent-magnet-inserting holes 34A, 34B, and 34C, are parallel to the shaft of the rotor 30. That is, the permanent-magnet-inserting hole 34 is not inclined, that is, not skewed, with respect to the shaft of the rotor. That the permanent-magnet-inserting hole 34 is not skewed means that the rotor core is of uniform shape in the depth direction (longitudinal).

Permanent magnets 36A, 36B, and 36C, which are rectangular solids, are inserted into the permanent-magnet-inserting holes 34A, 34B, and 34C, respectively. Therefore, one pole comprises a plurality of permanent magnets 36A, 36B, and 36C. The longitudinal directions of the permanent magnets 36A, 36B, and 36C, each parallel to the shaft of the rotor, are not skewed.

If the length of the permanent-magnet-inserting holes 34A, 34B, and 34C is L (L equals the length of the rotor 30 in the shaft direction), then the length of the permanent magnets 36A, 36B, and 36C is L/2, respectively. When the permanent magnets 36A and 36C are arranged on the left side in the shaft direction of the rotor 30, the permanent magnet 36B is arranged on the right side in the shaft direction of the rotor 30. Because the permanent magnets 36A and 36C are arranged on both sides of the permanent magnet 36B in the rotational direction of the rotor, the plurality of permanent magnets 36A, 36B, and 36C are arranged symmetrically with respect to the pole. However, because the permanent magnets are arranged asymmetrically with respect to the depth direction (shaft direction) of the rotor 30, they are arranged irregularly with respect to the longitudinal direction (depth direction, shaft direction) of the rotor 30.

The rotor 30 is arranged such that it is opposed to the inner periphery of the stator 20 as shown in FIG. 1. When the surface areas of the permanent magnets 36A, 36B, and 36C opposed to the stator 20 are SA, SB, and SC, respectively, SA=SC and SA+SC=SB. As a result, the magnetic flux generated by the permanent magnet 36B in the center of one pole of the rotor equals the magnetic flux generated by the between-pole permanent magnets 36A and 36C of one pole of the rotor.

Next, with reference to FIG. 3, the structure of the stator and the rotor of the permanent magnet rotating electric machine in the first embodiment of the present invention will be described.

Figure 3:
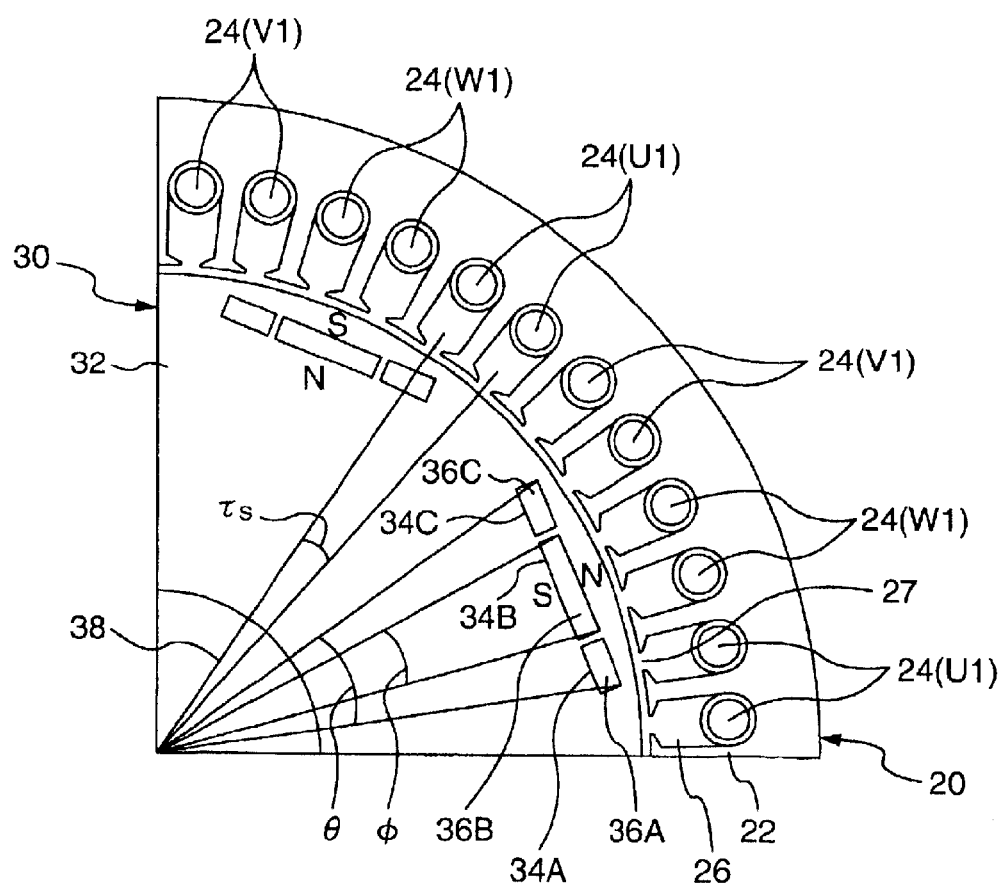
FIG. 3 is a side view showing the structure of the stator and the rotor of the permanent magnet rotating electric machine in the first embodiment of the present invention.

FIG. 3 is a side view showing the structure of the stator and the rotor of the permanent magnet rotating electric machine in the first embodiment of the present invention. This figure shows two poles, that is, one pole pair, of a three-phase, 8-pole/48-slot permanent magnet rotating electric machine. In the figure, the reference numerals, which are the same as those in FIG. 1, denote the same structural elements.

The stator 20 has the stator core 22 that is almost circular, and 48 slots 26 are formed on the stator core 22. This figure shows 12 slots 26 corresponding to one pole pair. In the slots 26, U-phase stator windings 24 (U1), V-phase stator windings 24 (V1), and W-phase stator windings 24 (W1) are inserted. An opening 27 is provided for each slot 26 on the inner periphery of the stator core 22.

On the other hand, the rotor 30 is built by fixing the rotor core 32 on the shaft 38 with the permanent magnets 36A, 36B, and 36C inserted into the permanent-magnet-inserting holes formed on the rotor core 32.

The rotor 30 is arranged rotatably within the stator with a predetermined gap 28 between the rotor and the inner periphery of the stator core 22. The rotor core 32 is structured by layering many silicon steel plates each with permanent-magnet-inserting holes. As shown in the figure, the permanent magnets 36 are magnetized such that the polarity alternates between the N pole and the S pole for each pole.

For each pole of the rotor 30, let θ be the angle between between-pole permanent-magnet-inserting holes 34A and 34C with its vertex at the center of the shaft (in the figure, the angle between the left corner of the part on the stator opposed to the inserting hole 34C (where magnetic flux is generated) and the right corner of the part on the stator opposed to the inserting hole 34A (where magnetic flux is generated)), let φ be the angle of the pole-center permanent-magnet-inserting hole 34B with its vertex at the center of the shaft (in the figure, the angle between the left corner of the part on the stator opposed to the inserting hole 34B and the right corner of the part on the stator opposed to the inserting hole 34B), and let τs be the slot pitch (spacing between adjacent slots 26). Then, inserting Neodymium permanent magnets 36A, 36B, and 36C based on the relation indicated by expression (2) gives an efficient result:

$$\theta = (n+0.5) \times \tau s + \phi \qquad (2)$$

where, n is an integer.

For a three-phase, 8-pole/48-slot permanent magnet rotating electric machine, the slot pitch τs is the mechanical angle of 7.5° (electrical angle of 30°). Therefore, if n=1 in expression (2), θ=22.5° (mechanical angle) (electrical angle of 90°) when φ=11.25° (mechanical angle) (electrical angle of 45°). That is, the magnetic flux generated by the first term on the right side of expression (2) equals the magnetic flux generated by the second term.

Next, with reference to FIGS. 4 and 5, the magnetic field analysis result of the permanent magnet rotating electric machine in the first embodiment of the present invention will be described.

Figure 4:
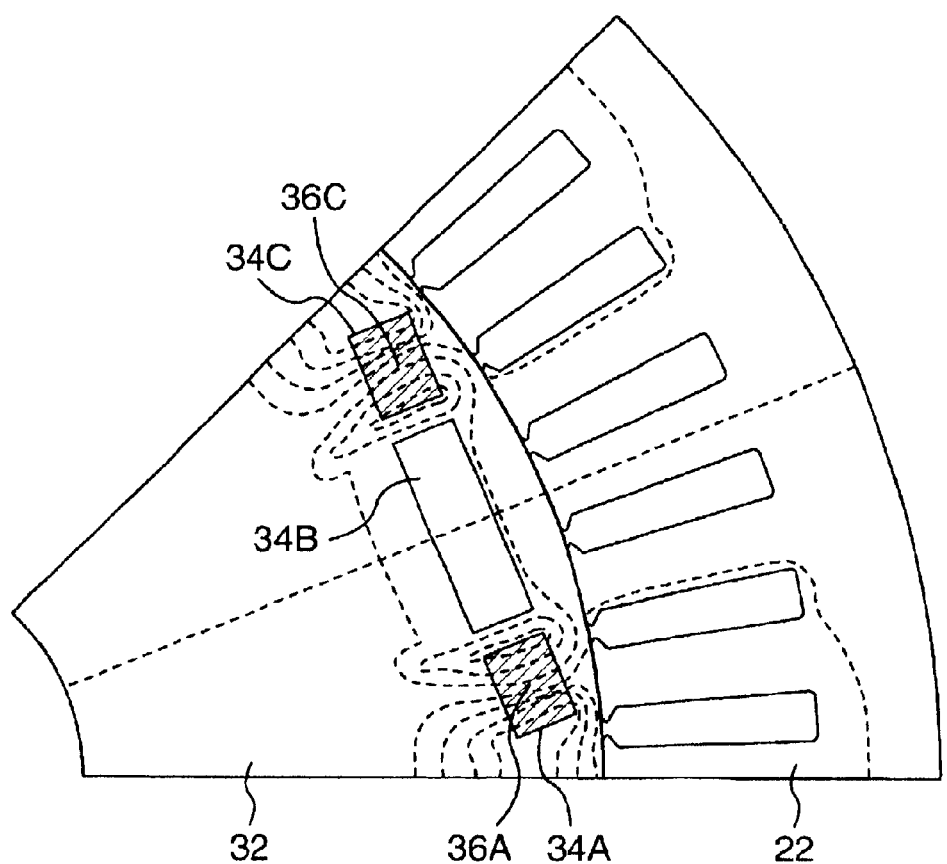
FIG. 4 is a diagram showing the result of magnetic field analysis that is made by inserting magnets into the between-pole inserting holes of the permanent magnet rotating electric machine in the first embodiment of the present invention.

FIG. 4 is a diagram showing the result of magnetic field analysis that is made by inserting magnets into the between-pole inserting holes of the permanent magnet rotating electric machine in the first embodiment of the present invention. FIG. 5 is a diagram showing the result of magnetic field analysis that is made by inserting a magnet into the pole-center inserting hole of the permanent magnet rotating electric machine in the first embodiment of the present invention. Those figures show one pole of a three-phase, 8-pole/48-slot permanent magnet rotating electric machine. In the figures, the reference numerals, which are the same as those in FIG. 3, denote the same structural elements.

FIG. 4 shows the result of magnetic field analysis when magnets are inserted into the between-pole inserting holes. That is, the figure shows the result of magnetic field analysis that is made by inserting the permanent magnets 36A and 36C into the between-pole magnet-inserting holes 34A and 34C, respectively, with no permanent magnet in the pole-center magnet-inserting hole 34B. The broken line indicates a magnetic field.

Figure 5:
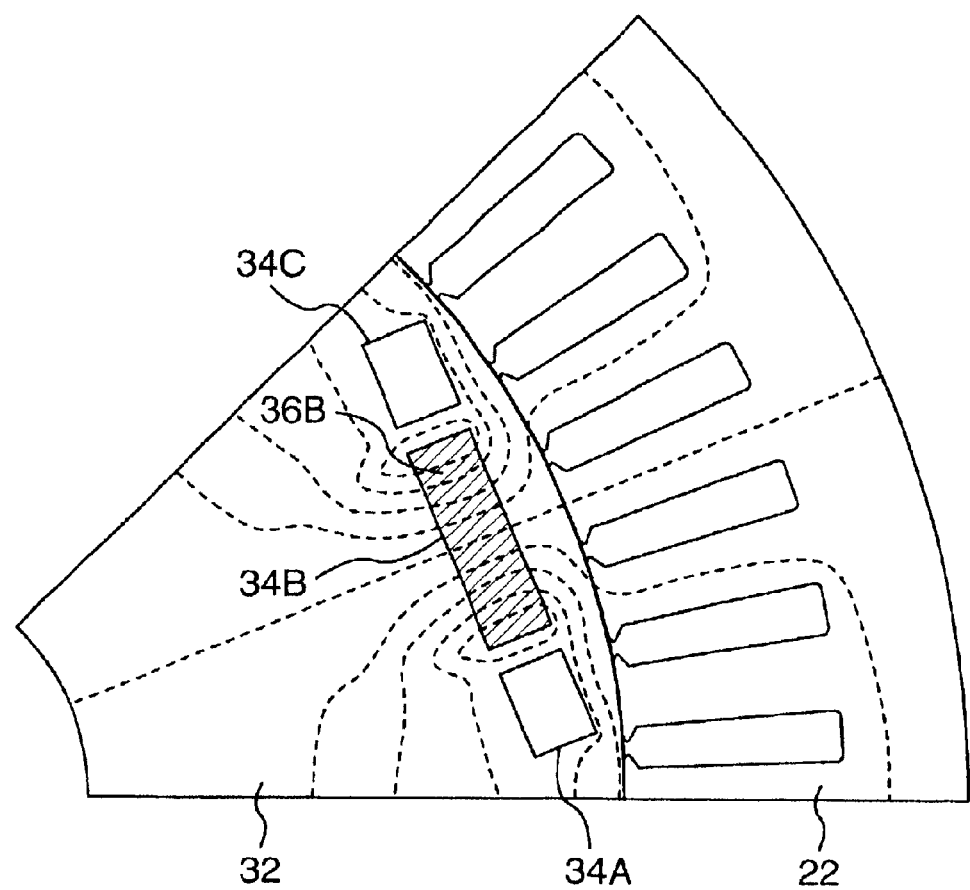
FIG. 5 is a diagram showing the result of magnetic field analysis that is made by inserting a magnet into the pole-center inserting hole of the permanent magnet rotating electric machine in the first embodiment of the present invention.

FIG. 5 shows the result of magnetic field analysis when a magnet is inserted into the pole-center inserting hole. That is, the figure shows the result of magnetic field analysis that is made by inserting the permanent magnet 36B into the pole-center magnet-inserting hole 34B with no permanent magnet in the between-pole magnet-inserting holes 34A and 34C. The broken line indicates a magnetic field.

Next, with reference to FIGS. 6–8, the torque pulsation of the permanent magnet rotating electric machine in the first embodiment of the present invention will be described.

Figure 6:
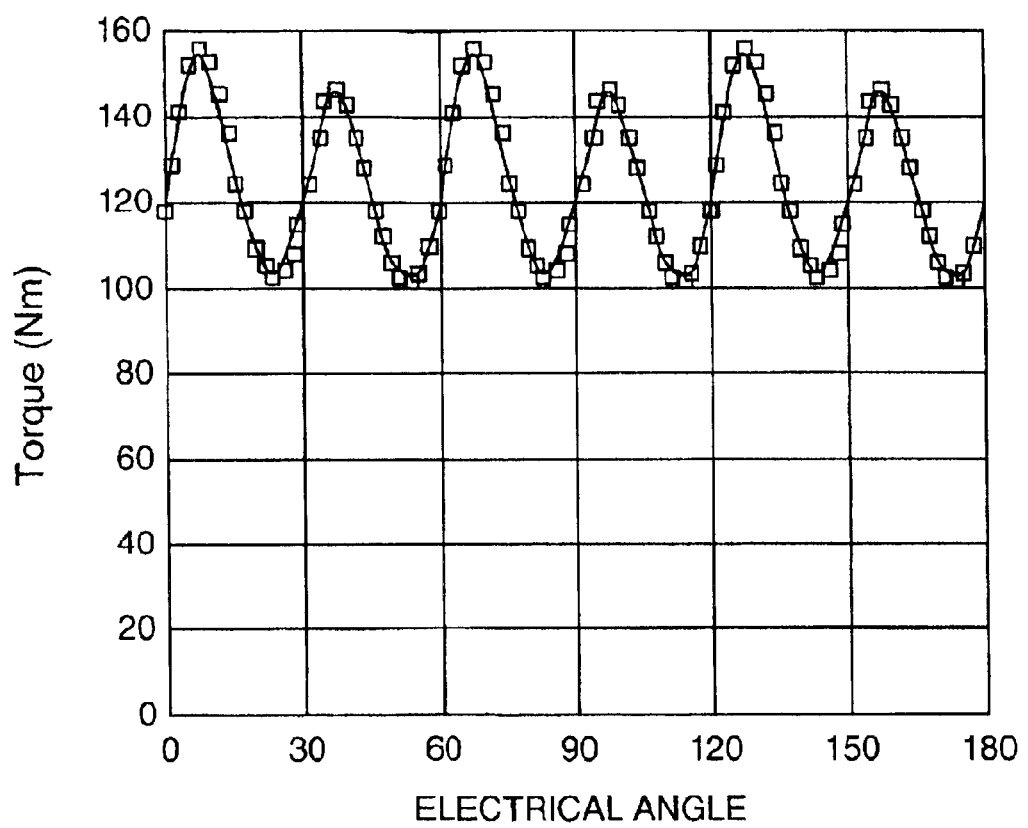
FIG. 6 is a diagram showing a torque pulsation when magnets are inserted into the between-pole inserting holes of the permanent magnet rotating electric machine in the first embodiment of the present invention.

FIG. 6 is a diagram showing a torque pulsation when magnets are inserted into the between-pole inserting holes in the permanent magnet rotating electric machine in the first embodiment of the present invention. FIG. 7 is a diagram showing a torque pulsation when a magnet is inserted into the pole-center inserting hole of the permanent magnet rotating electric machine in the first embodiment of the present invention. FIG. 8 is a diagram showing a torque pulsation in the permanent magnet rotating electric machine in the first embodiment of the present invention. The figures show the torque pulsation for one pole of a three-phase, 8-pole/48-slot permanent magnet rotating electric machine.

FIG. 6 shows the torque pulsation for one pole (electrical angle of 180°) when the magnets are inserted into the between-pole inserting holes as shown in FIG. 4.

Figure 7:
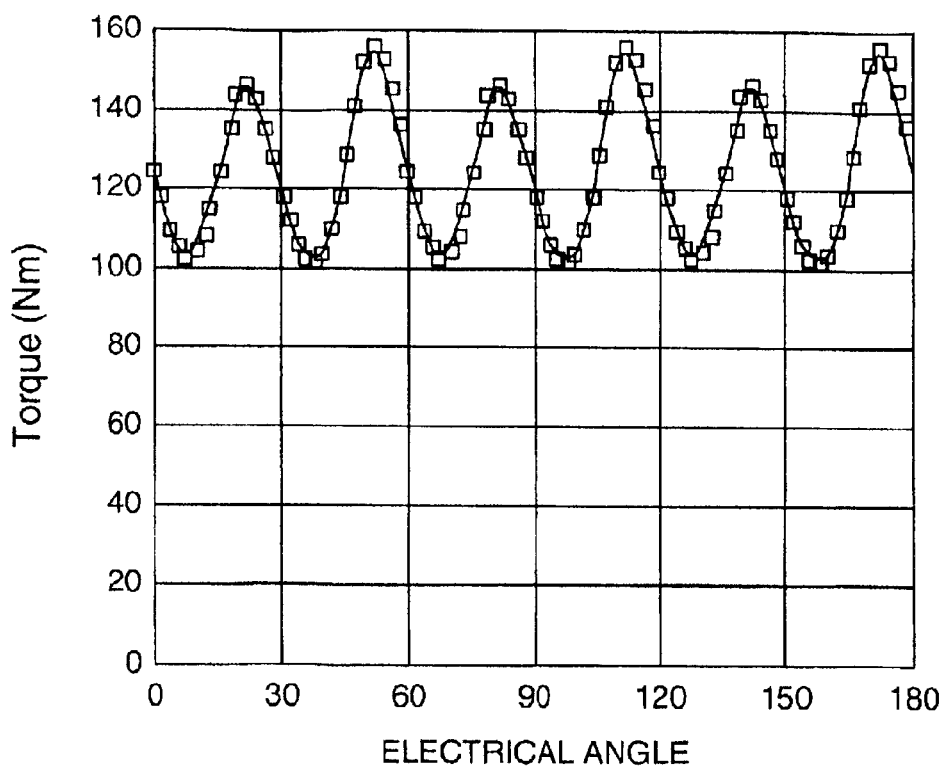
FIG. 7 is a diagram showing a torque pulsation when a magnet is inserted into the pole-center inserting hole of the permanent magnet rotating electric machine in the first embodiment of the present invention.

FIG. 7 shows the torque pulsation for one pole (electrical angle of 180°) when the magnet is inserted into the pole-center inserting hole as shown in FIG. 5.

Because the cores in FIG. 4 and FIG. 5 are of the same shape, they have an equal reluctance torque. In addition, because the magnet surface area is sized such that the cores have an almost equal magnet flux (S1+S3=S2), they have an almost equal magnet torque. Therefore, the average torque in FIG. 6 equals the average torque in FIG. 7.

As seen in the waveform shown in FIG. 6, six periods of torque pulsation are generated for one pole (48 periods for rotation), one for each slot. A torque pulsation is generated by the difference in magnetic flux concentration between the iron teeth and the gap slot. The waveform of a torque pulsation is closely related to the magnet pole-arc angle and, as the pole-arc angle changes, the waveform of the torque pulsation changes. The waveform of the torque pulsation in FIG. 7 with the pole-arc angle of φ, where θ=(n+0.5)×τs+φ, is the reverse of the waveform of the torque pulsation in FIG. 6 with the pole-arc angle of θ.

Figure 8:
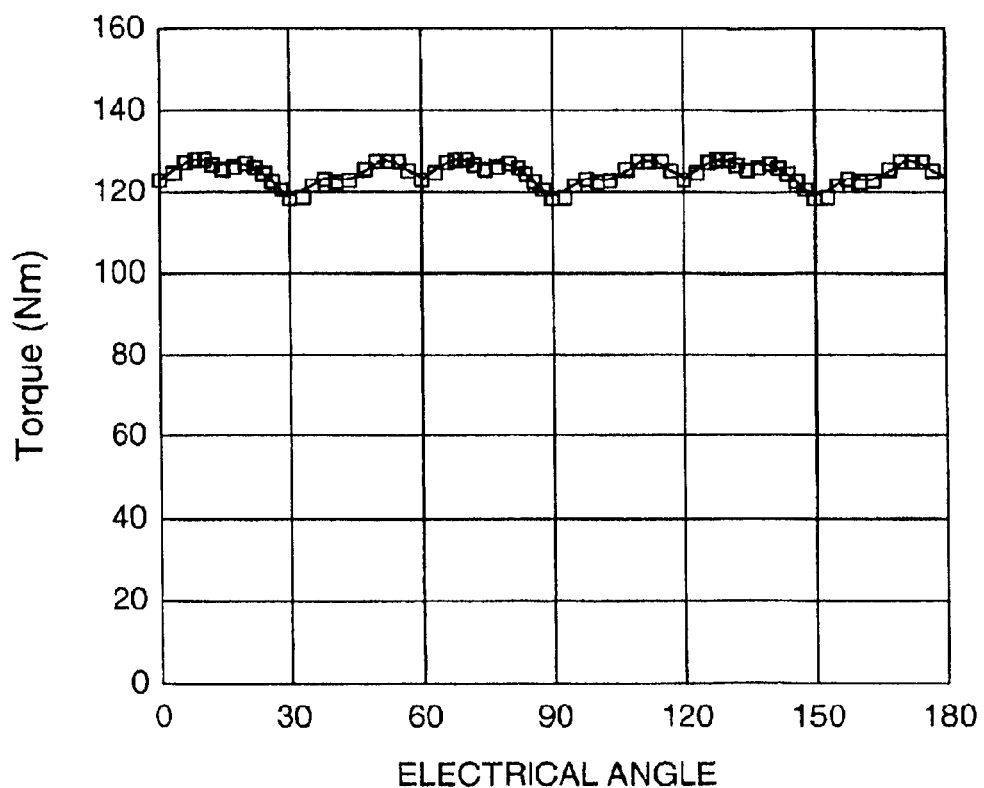
FIG. 8 is a diagram showing a torque pulsation in the permanent magnet rotating electric machine in the first embodiment of the present invention.

Therefore, when the magnets in FIG. 3 and FIG. 4 are arranged half and half in the longitudinal direction as in this embodiment, combining the torque pulsation shown in FIG. 6 with the torque pulsation shown in FIG. 7 produces the torque pulsation shown in FIG. 8. As apparently indicated by the torque waveform shown in FIG. 8, the torque pulsation is reduced in this embodiment. Calculating the ripple rate for use in comparison indicates that the ripple rate is 22% in FIGS. 6 and 7, and 4% in this embodiment as shown in FIG. 8. This is an 18% improvement in the ripple rate. This reduction in the pulsation torque minimizes the vibration and the noise of the permanent magnet rotating electric machine.

As described above, this embodiment reduces the torque pulsation by arranging the permanent magnets symmetrically with respect to the rotation direction but irregularly with respect to the depth direction for each pole of the rotor of the permanent magnet rotating electric machine and, in particular, by making θ satisfy the relation θ=(n+0.5)×τs+φ (n is an integer) wherein θ is the angle between between-pole permanent-magnet-inserting holes with its vertex at the center of the shaft, φ is the angle of the pole-center permanent-magnet-inserting hole with its vertex at the center of the shaft, and τs is the slot pitch. This embodiment makes it possible to provide an electric vehicle that can run efficiently with a less vibrating, less noisy motor.

Next, with reference to FIG. 9 and FIG. 10, the configuration of a permanent magnet rotating electric machine in a second embodiment of the present invention will be described. The general configuration of the permanent magnet rotating electric machine in this embodiment is the same as that shown in FIG. 1 and FIG. 2.

Figure 9:
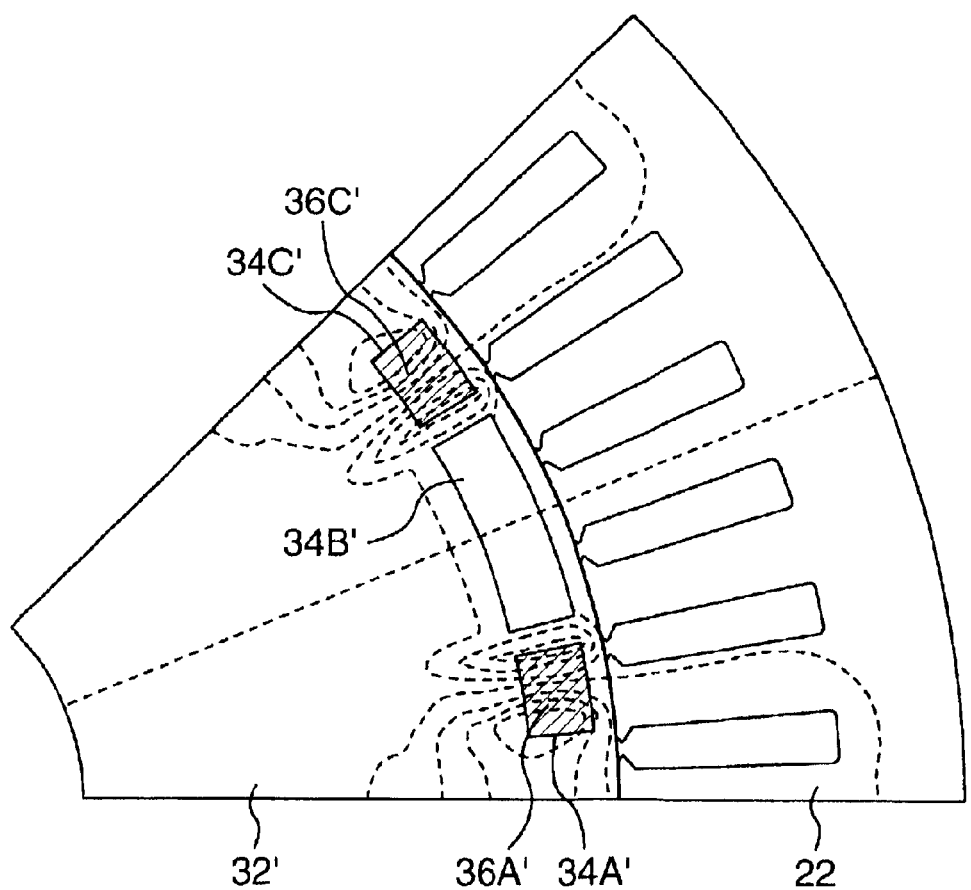
FIG. 9 is a diagram showing the structure of the stator and the rotor of a permanent magnet rotating electric machine in a second embodiment of the present invention and showing the result of magnetic field analysis that is made by inserting magnets into the between-pole inserting holes.

FIG. 9 is a diagram showing the structure of the stator and the rotor, and the result of magnetic field analysis when magnets are inserted into the between-pole inserting holes, of the permanent magnet rotating electric machine in the second embodiment of the present invention. FIG. 10 is a diagram showing the result of magnetic field analysis when a magnet is inserted into the pole-center inserting hole of the permanent magnet rotating electric machine in the second embodiment of the present invention. In the figures, one pole of a three-phase, 8-pole/48-slot permanent magnet rotating electric machine is shown. The reference numerals in the figures, which are the same as those in FIG. 3, denote the same structural elements.

As shown in FIG. 9, permanent-magnet-inserting holes 34A', 34B', and 34C' are each in the shape of an arc. They each have a columnar structure with an arc-shaped cross section. Therefore, the permanent magnets 36A' and 36C' inserted into the permanent-magnet-inserting holes 34A' and 34C' also have a columnar structure with an arc-shaped cross section.

FIG. 9 shows the result of magnetic field analysis when the magnets are inserted into the between-pole inserting holes. The broken line indicates a magnetic field.

Figure 10:
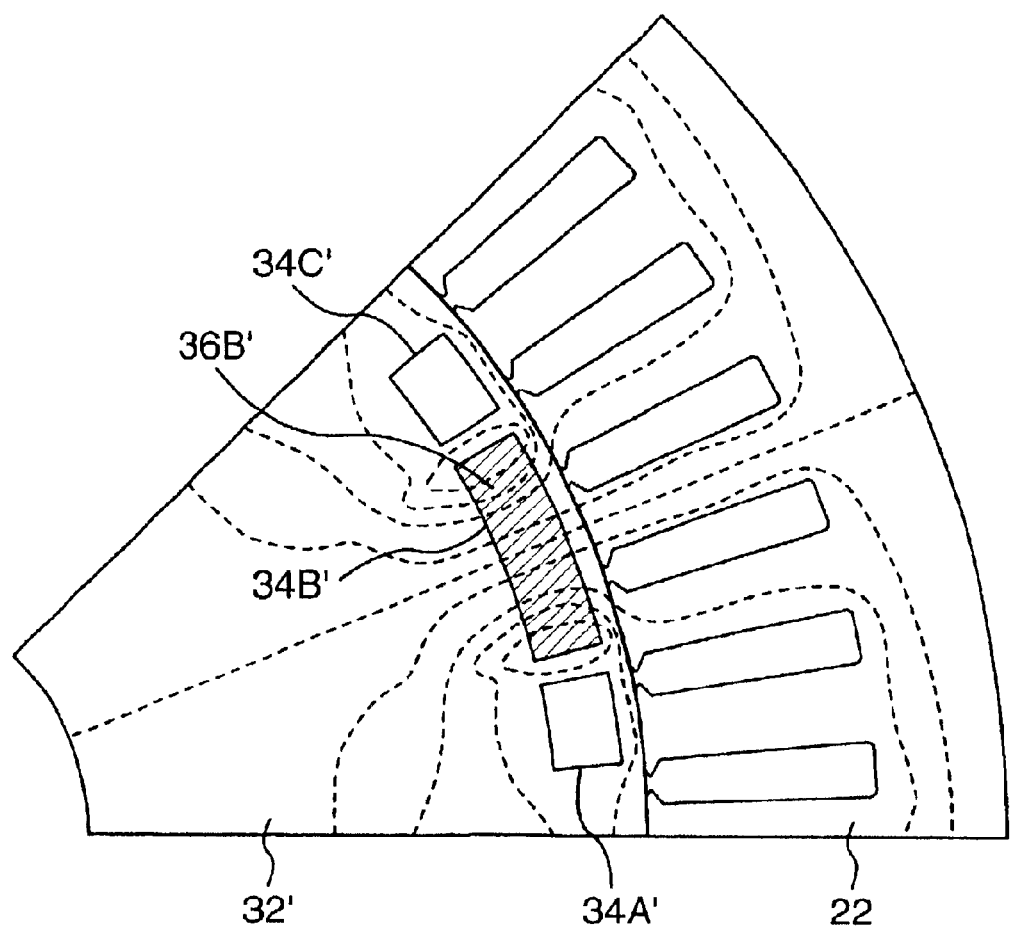
FIG. 10 is a diagram showing the result of magnetic field analysis that is made by inserting a magnet into the pole-center inserting hole of the permanent magnet rotating electric machine in the second embodiment of the present invention.

FIG. 10 shows the result of magnetic field analysis when a magnet is inserted into the central inserting hole, that is, when the permanent magnet 36B' is inserted into the central magnet inserting hole 34B' with no permanent magnets in the between-pole inserting holes 34A' and 34C'. The broken line indicates a magnetic field.

The use of arc-shaped permanent magnets increases the effective magnetic field and the torque that is generated.

The torque pulsation of the permanent magnet rotating electric machine in this embodiment are as shown in FIGS. 6 and 7. The torque pulsation of the whole rotating electric machine may be also reduced as shown by the waveform of the torque pulsation that is a combination of the torque pulsation shown in FIG. 6 and the torque pulsation shown in FIG. 7.

As described above, this embodiment reduces the torque pulsation by arranging the permanent magnets symmetrically with respect to the rotation direction, but irregularly with respect to the depth direction, for each pole of the rotor of the permanent magnet rotating electric machine. This embodiment also makes it possible to provide an electric vehicle that can run efficiently with a less vibrating, less noisy motor.

Next, with reference to FIG. 11, the configuration of a permanent magnet rotating electric machine in a third embodiment of the present invention will be described. The general configuration of the permanent magnet rotating electric machine in this embodiment is the same as that shown in FIG. 1.

Figure 11:
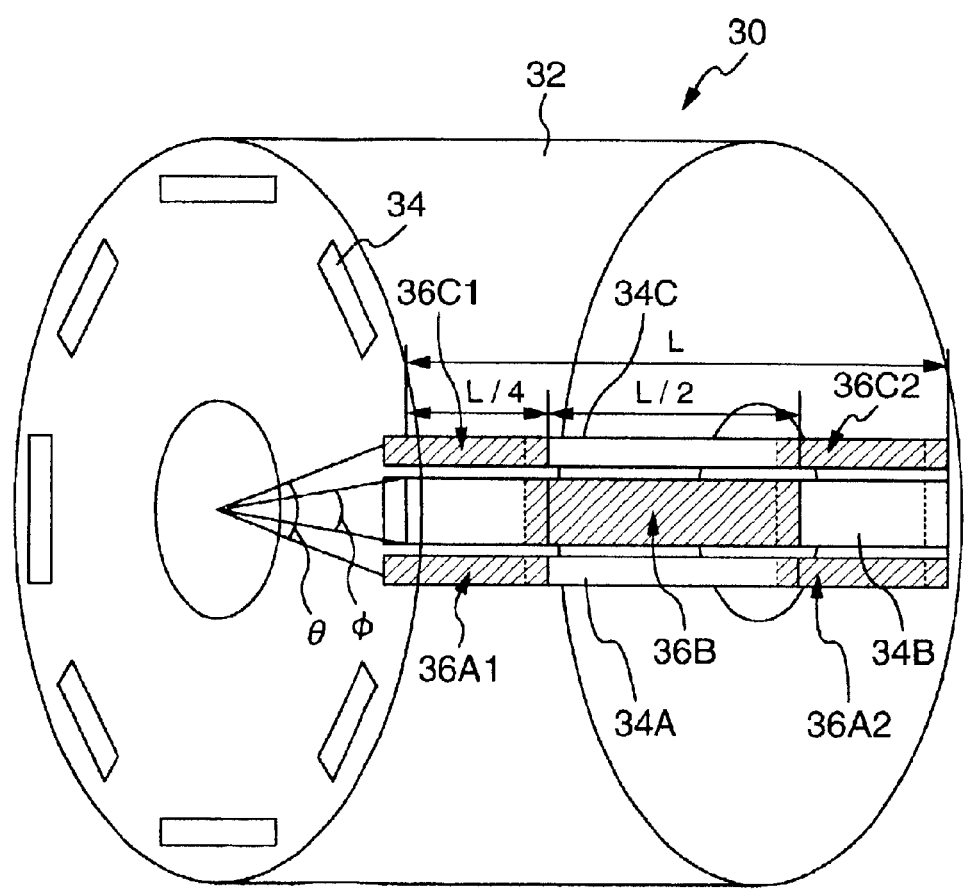
FIG. 11 is a skeleton perspective view in the rotor depth (longitudinal) direction of a rotor, illustrating the magnet arrangement structure in a permanent magnet rotating electric machine in a third embodiment of the present invention.

FIG. 11 is a skeleton perspective view in the rotor depth (longitudinal) direction of the rotor, illustrating the magnet arrangement structure in the permanent magnet rotating electric machine in the third embodiment of the present invention. The same reference numerals as those in FIG. 1 indicate the same structural elements.

A plurality of permanent-magnet-inserting holes 34 are formed in the rotor core 32 of the rotor 30. For a three-phase, 8-pole/48-slot permanent magnet rotating electric machine, eight permanent-magnet-inserting holes 34 are usually provided. As in FIG. 2, one pole comprises three permanent-magnet-inserting holes, 34A, 34B, and 34C. The permanent-magnet-inserting holes 34A, 34B, and 34C, are parallel to the shaft of the rotor 30. That is, the permanent-magnet-inserting hole 34 is not inclined, that is, not skewed, with respect to the shaft of the rotor.

Permanent magnets 36A1, 36A2, 36B, 36C1, and 36C2, which are rectangular solids, are inserted into the permanent-magnet-inserting holes 34A, 34B, and 34C, respectively. Therefore, one pole comprises a plurality of permanent magnets 36A1, 36A2, 36B, 36C1, and 36C2. The longitudinal directions of the permanent magnets 36A1, 36A2, 36B, 36C1, and 36C2, each parallel to the shaft of the rotor, are not skewed.

If the length of the permanent-magnet-inserting holes 34A, 34B, and 34C is L (L equals the length of the rotor 30 in the shaft direction), then the length of the permanent magnets 36A1, 36A2, 36C1, and 36C2 is L/4, respectively, and the length of the permanent magnet 36B is L/2. When the permanent magnets 36A1, 36A2, 36C1, and 36C2 are arranged on the right and left sides in the shaft direction of the rotor 30, the permanent magnet 36B is arranged in the center of the shaft direction of the rotor 30. Because the permanent magnets 36A1, 36A2, 36C1, and 36C2 are arranged on both sides of the permanent magnet 36B in the rotational direction of the rotor, the plurality of permanent magnets 36A1, 36A2, 36B, 36C1, and 36C2 are arranged symmetrically with respect to the pole. However, they are arranged irregularly with respect to the depth direction (shaft direction) of the rotor 30.

The rotor 30 is arranged such that it is opposed to the inner periphery of the stator 20 as shown in FIG. 1. When the surface areas of the permanent magnets 36A1, 36A2, 36B, 36C1, and 36C2 opposed to the stator 20 are SA1, SA2, SB, SC1, and SC2, respectively, SA1=SA2=SC1=SC2 and SA1+SA2+SC1+SC2=SB. As a result, the magnetic flux generated by the permanent magnet 36B in the center of one pole of the rotor equals the magnetic flux generated by the between-pole permanent magnets 36A1, 36A2, 36C1, and 36C2 of one pole of the rotor.

As described above, the magnets need not be arranged in the longitudinal direction by halving them at the center as shown in FIG. 2. The magnets may also be arranged such that one part of the between-pole magnets and other part of the between-pole magnets each occupy ¼ and the central magnet occupies ½ to make the longitudinal direction ratio 1:1 as shown in FIG. 11.

The torque pulsation of the permanent magnet rotating electric machine in this embodiment is as shown in FIGS. 6 and 7. The torque pulsation of the whole rotating electric machine may be also reduced as shown by the waveform of the torque pulsation that is a combination of the torque pulsation shown in FIG. 6 and the torque pulsation shown in FIG. 7.

As described above, this embodiment reduces the torque pulsation by arranging the permanent magnets symmetrically with respect to the rotation direction, but irregularly with respect to the depth direction, for each pole of the rotor of the permanent magnet rotating electric machine. This embodiment also makes it possible to provide an electric vehicle that can run efficiently with a less vibrating, less noisy motor. Next, with reference to FIG. 12 and FIG. 13, the configuration of a permanent magnet rotating electric machine in a fourth embodiment of the present invention will be described. The general configuration of the permanent magnet rotating electric machine in this embodiment is the same as that shown in FIG. 1 and FIG. 2.

Figure 12:
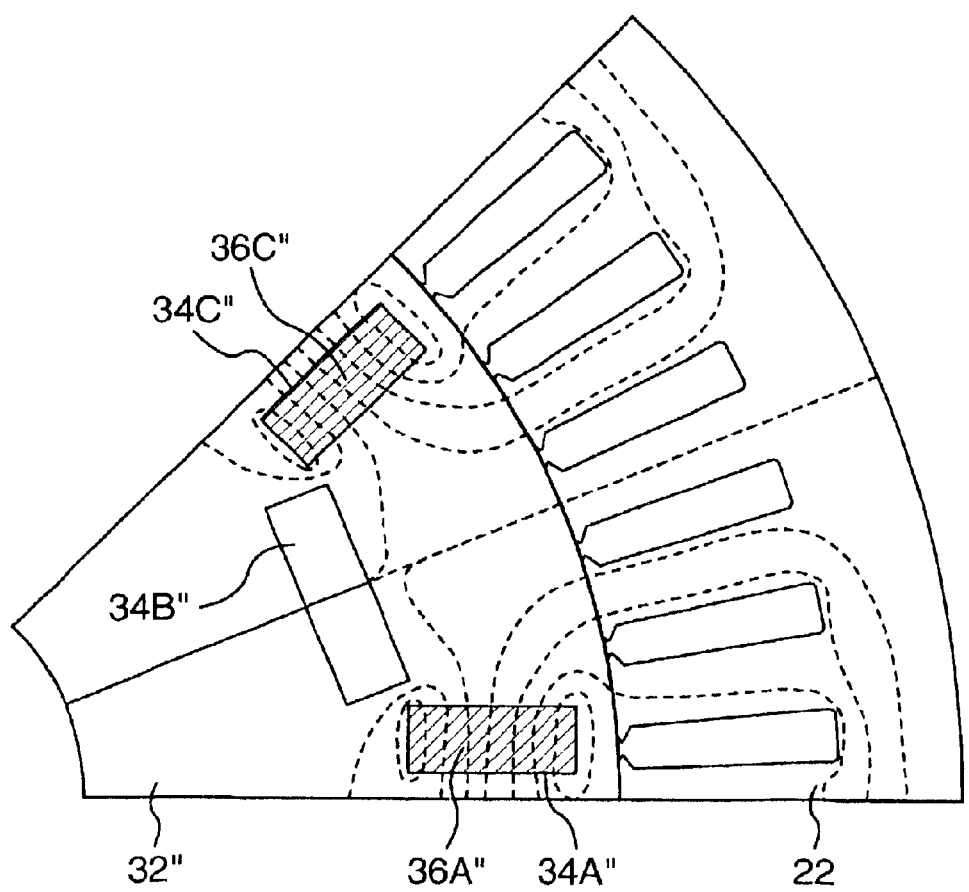
FIG. 12 is a diagram showing the structure of the stator and the rotor of a permanent magnet rotating electric machine in a fourth embodiment of the present invention and showing the result of magnetic field analysis that is made by inserting magnets into the between-pole inserting holes.
Figure 13:
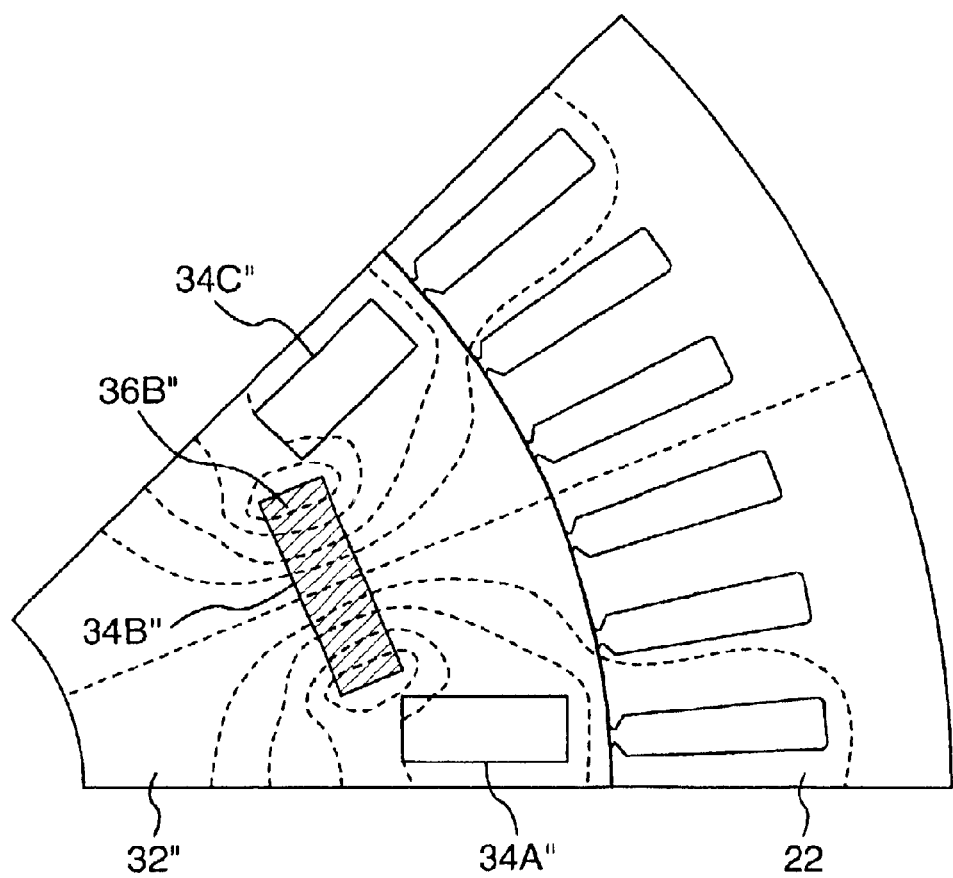
FIG. 13 is a diagram showing the result of magnetic field analysis that is made by inserting a magnet into the pole-center inserting hole of the permanent magnet rotating electric machine in the fourth embodiment of the present invention.

FIG. 12 is a diagram showing the structure of the stator and the rotor of the permanent magnet rotating electric machine in the fourth embodiment of the present invention and the result of magnetic field analysis when magnets are inserted into the between-pole inserting holes. FIG. 13 is a diagram showing the result of magnetic field analysis when a magnet is inserted into the pole-center inserting hole of the permanent magnet rotating electric machine in the fourth embodiment of the present invention. In the figures, one pole of a three-phase, 8-pole/48-slot permanent magnet rotating electric machine is shown. The reference numerals in the figures, which are the same as those in FIG. 3, denote the same structural elements.

In the examples shown in FIGS. 4 and 5 and FIGS. 9 and 10, the pole-arc angle of $\phi$ is 90° or lower and the magnet torque cannot be increased in order for the pole-arc angle $\theta$ of the between-pole magnet-inserting holes to satisfy the relation $\theta=(n+0.5)\times\tau s+\phi$ where $\theta$ is the pole-arc angle of the between-pole magnet inserting holes, $\phi$ is the pole-arc angle in the center of the pole, and $\tau s$ is the slot pitch.

To solve this problem, permanent-magnetic inserting holes 34A" and 34C" each have a rectangular cross section with the longer side in the radius direction of the rotor, as shown in FIG. 12. The longer side of a permanent-magnet inserting hole 34B" is in the circumferential direction of the rotor. A plurality of permanent magnets 36A", 36B", and 36C" are inserted into the permanent-magnet inserting holes 34A", 34B", and 34C" as shown in FIG. 2. They may also be inserted as shown in FIG. 11. This configuration changes the part of the permanent-magnet surface area opposed to the stator as follows. That is, the surface area of the permanent magnets 36A" and 36C" becomes smaller than the surface area of the permanent magnet 36B". Therefore, to make the magnetic flux generated by the permanent magnets 36A" and 36C" equal to that generated by the permanent magnet 36B", the permanent magnet 36B" is arranged near the center of rotation in the radius direction of the rotor to increase the distance from the stator. FIG. 12 shows the result of magnetic field analysis when the magnets 36A" and 36C" are inserted into the between-pole inserting holes. The broken line indicates a magnetic field.

FIG. 13 shows the result of magnetic field analysis when the magnet is inserted into the central inserting hole, that is, when the permanent magnet 36B" is inserted into the central magnet inserting hole 34B" with no permanent magnets in the between-pole inserting holes 34A" and 34C". The broken line indicates a magnetic field.

Arranging the longer sides of the between-pole magnets 36A" and 36A" in the radius direction as described above makes it possible for the relation $\theta=(n+0.5)\times\tau s+\phi$ and the magnetic flux equality condition compatible with high magnetic torques.

The torque pulsation of the permanent magnet rotating electric machine in this embodiment are as shown in FIGS. 6 and 7. The torque pulsation of the whole rotating electric machine may be also reduced as shown by the waveform of the torque pulsation that is a combination of the torque pulsation shown in FIG. 6 and the torque pulsation shown in FIG. 7.

As described above, this embodiment reduces the torque pulsation and generates high torques by arranging the permanent magnets symmetrically with respect to the rotation direction, but irregularly with respect to the depth direction, for each pole of the rotor of the permanent magnet rotating electric machine. This embodiment also makes it possible to provide an electric vehicle that can run efficiently with a less vibrating, less noisy motor.

Next, with reference to FIG. 14 and FIG. 15, the configuration of a permanent magnet rotating electric machine in a fifth embodiment of the present invention will be described. The general configuration of the permanent magnet rotating electric machine in this embodiment is the same as that shown in FIG. 1 and FIG. 2.

Figure 14:
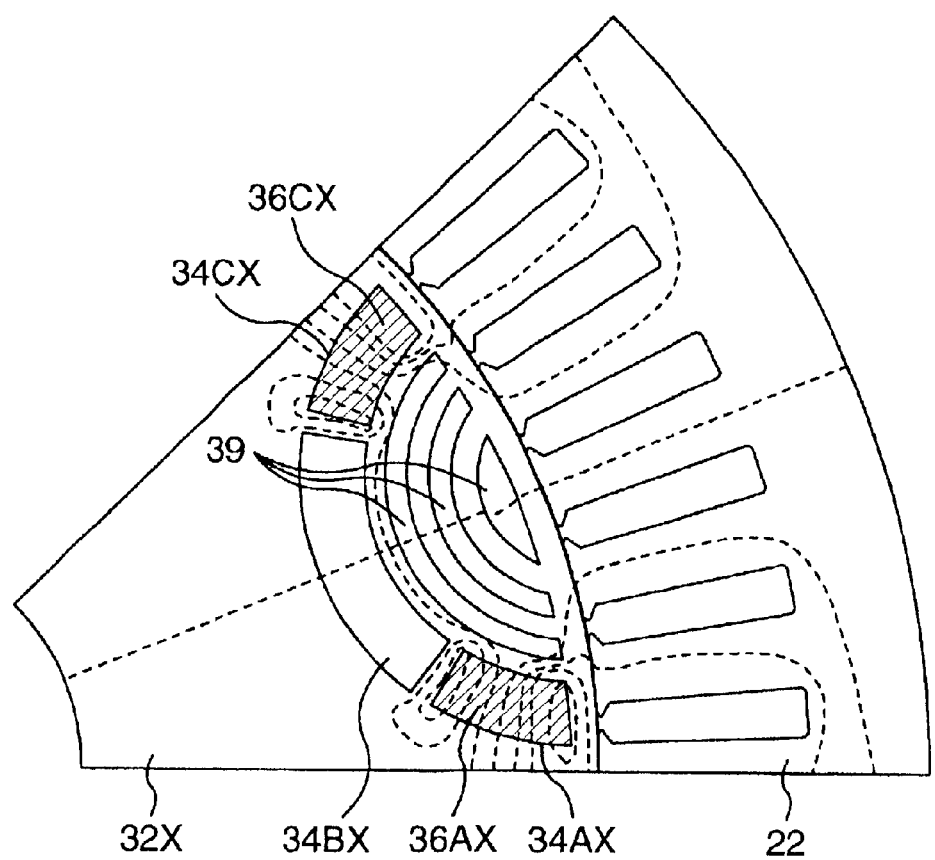
FIG. 14 is a diagram showing the structure of the stator and the rotor of a permanent magnet rotating electric machine in a fifth embodiment of the present invention and showing the result of magnetic field analysis that is made by inserting magnets into the between-pole inserting holes.

FIG. 14 is a diagram showing the structure of the stator and the rotor of the permanent magnet rotating electric machine in the fifth embodiment of the present invention and the result of magnetic field analysis when magnets are inserted into the between-pole inserting holes. FIG. 15 is a diagram showing the result of magnetic field analysis when a magnet is inserted into the pole-center inserting hole of the permanent magnet rotating electric machine in the fifth embodiment of the present invention. In the figures, one pole of a three-phase, 8-pole/48-slot permanent magnet rotating electric machine is shown. The reference numerals in the figures, which are the same as those in FIG. 3, denote the same structural elements.

As shown in FIG. 14, permanent-magnet-inserting holes 34Ax, 34Bx, and 34Cx are each in the shape of a convex arc toward the outer periphery of the rotor. They have a columnar structure with an arc-shaped cross section. Therefore, the permanent magnets 36Ax and 36Cx, which are inserted into the permanent-magnet inserting holes 34Ax and 34Cx, also have a columnar structure with an arc-shaped cross section.

The rotating electric machine in this embodiment has a better effect when reluctance torque is large. For this reason, a plurality of slits 39 are provided on the outer periphery side of the permanent magnet 36 of the rotor.

FIG. 14 also shows the result of magnetic field analysis when magnets are inserted into the between-pole inserting holes. The broken line indicates a magnetic field.

Figure 15:
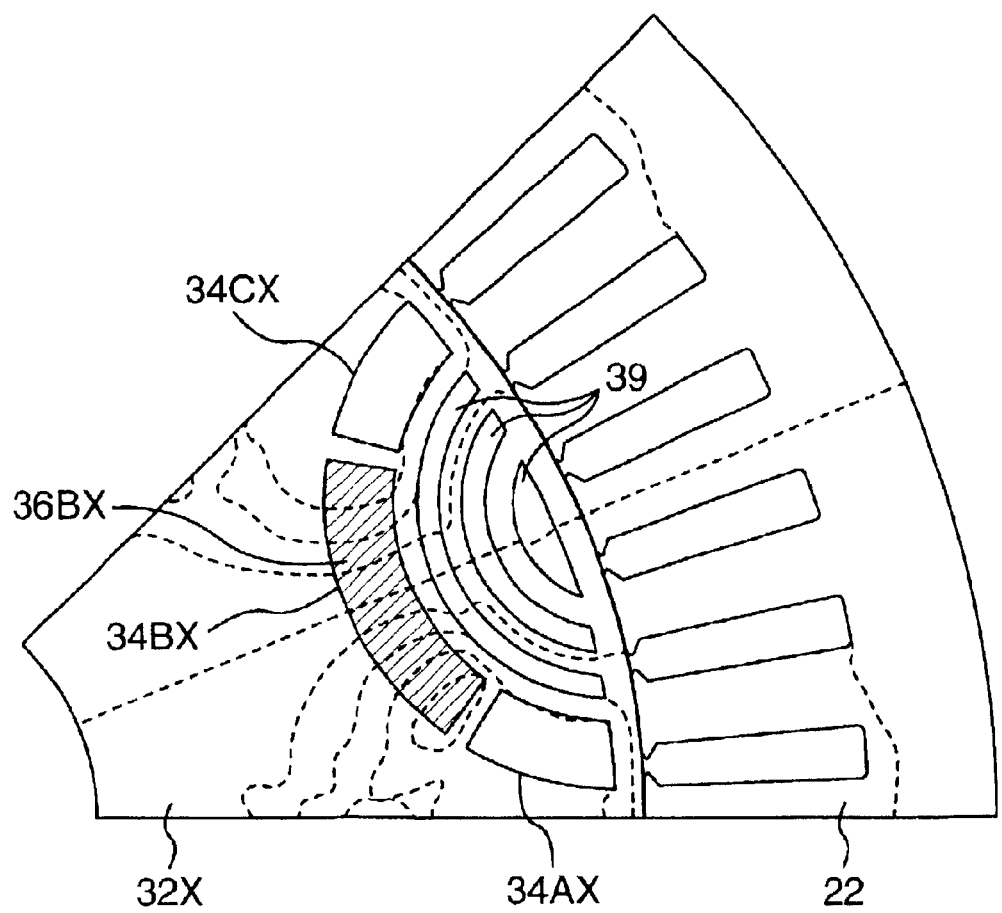
FIG. 15 is a diagram showing the result of magnetic field analysis that is made by inserting a magnet into the pole-center inserting hole of the permanent magnet rotating electric machine in the fifth embodiment of the present invention.

FIG. 15 shows the result of magnetic field analysis when a magnet is inserted into the central inserting hole, that is, when the permanent magnet 36Bx is inserted into the central magnet inserting hole 34Bx with no permanent magnet in the between-pole inserting holes 34Ax and 34Cx. The broken line indicates a magnetic field.

The torque pulsation of the permanent magnet rotating electric machine in this embodiment is as shown in FIGS. 6 and 7. The torque pulsation of the whole rotating electric machine may be also reduced as shown by the waveform of the torque pulsation that is a combination of the torque pulsation shown in FIG. 6 and the torque pulsation shown in FIG. 7.

As described above, this embodiment reduces the torque pulsation by arranging the permanent magnets symmetrically with respect to the rotation direction, but irregularly with respect to the depth direction, for each pole of the rotor of the permanent magnet rotating electric machine. This embodiment also makes it possible to provide an electric vehicle that can run efficiently with a less vibrating, less noisy motor.

In the above embodiments, the number of permanent magnets (number of poles) need not always be eight. Nor need the number of slots in the stator always be 48. In addition, the permanent magnet need not be a Neodymium magnet. It is needless to say that the magnet has an error in angle within the allowable manufacturing range (approximately, error ±1). The present invention is applied not only to an internal rotor type but also to an external rotor type.

The permanent magnet rotating electric machine according to the present invention uses no skewing under a predetermined current and voltage condition to prevent torque from decreasing and to decrease pulsation torque to provide a less vibrating, less noisy motor.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A permanent magnet rotating electric machine comprising:
    a stator having multi-phase stator windings;
    a rotor having a rotor core with a plurality of permanent-magnet-inserting holes formed therein; and
    a plurality of permanent magnets embedded in said permanent-magnet-inserting holes; wherein
    said rotor core is rotatably arranged with a predetermined gap relative to said stator;
    a core shape of the rotor is uniform in a longitudinal depth direction;
    a group of said permanent magnets are arranged for each pole of said rotor; and
    said group of permanent magnets are symmetrical about a central axis of each pole of said rotor in a rotation direction, but irregularly in the depth direction.

2. The permanent magnet rotating electric machine according to claim 1, wherein, for each pole, there are three or more permanent-magnet-inserting holes through which the permanent magnets are embedded into said rotor.

3. The permanent magnet rotating electric machine according to claim 1, wherein a ratio of a length of one permanent magnet arrangement to a length of another permanent magnet arrangement in the depth direction of said rotor is 1:1.

4. The permanent magnet rotating electric machine according to claim 1, wherein θ satisfies a relation $$\theta = (n+0.5) \times \tau s + \phi \, (n \text{ is an integer})$$

wherein, for each pole of said rotor, θ is an angle between between-pole permanent-magnet-inserting holes with its vertex at a center of a shaft, φ is an angle of a pole-center permanent-magnet-inserting hole with its vertex at the center of the shaft, and τs is a slot pitch.

5. The permanent magnet rotating electric machine according to claim 1, wherein, for each pole of said rotor, a magnetic flux generated from between-pole magnets equals a magnetic flux generated from a pole-center permanent magnet.

6. A permanent magnet rotating electric machine, comprising:
    a stator; and
    a rotor rotatably arranged with a predetermined gap to said stator; wherein,
    said stator comprises a stator core having a plurality of slots, and multi-phase stator windings inserted into said plurality of slots;
    said rotor comprises a rotary shaft, a rotor core provided on said rotary shaft and a plurality of permanent magnets embedded internally into said rotor core;
    a plurality of permanent-magnet-inserting holes and a plurality of magnetic poles configured by said plurality of permanent magnets are formed on said rotor core;
    each of said plurality of magnetic poles is configured by a group of said permanent magnets;
    said plurality of permanent-magnet-inserting holes are provided to embed said permanent magnets internally into said rotor core and are formed parallel to said rotary shaft;
    the group of said permanent magnets configuring each of said plurality of magnetic poles are inserted into said permanent-magnet-inserting holes and arranged within said rotor core so that said permanent magnets are parallel to said rotary shaft; and
    the group of said permanent magnets configuring each of said plurality of magnetic poles are arranged symmetrically with respect to a rotation direction of said rotor but not symmetrically with respect to a longitudinal direction of said rotor.

7. The permanent magnet rotating electric machine according to claim 6, wherein:
    a group of said permanent magnets configuring each of said plurality of magnetic poles includes a permanent magnet arranged in a between-pole side of said magnetic pole, and a permanent magnet arranged in a pole-center side of said magnetic pole; and
    a ratio between a length of the permanent magnet arranged in the between-pole side of said magnet pole in a longitudinal direction of said rotor and a length of the permanent magnet arranged in the pole-center side of said magnet pole in a longitudinal direction of said rotor is 1:1.

8. The permanent magnet rotating electric machine according to claim 6, wherein:
    a group of said permanent magnets configuring each of said plurality of magnetic poles includes a permanent magnet arranged in a between-pole side of said magnetic pole, and a permanent magnet arranged in a pole-center side of said magnetic pole; and
    when an angle subtended by said permanent-magnet-inserting hole, in which said permanent magnet arranged in the between-pole side of said magnetic pole is inserted, about a pole center is θ, an angle subtended by said permanent-magnet-inserting hole, in which said permanent magnet arranged in the pole-center side of said magnetic pole is inserted, about said pole center is φ, a pitch of said slot is τs, φ satisfies a relation $$\theta = (n+0.5) \times \tau s + \phi \, (\text{where, } n \text{ is an integer}).$$

9. The permanent magnet rotating electric machine according to claim 6, wherein:
    a group of said permanent magnets configuring each of said plurality of magnetic poles includes a permanent magnet arranged in a between-pole side of said magnetic pole, and a permanent magnet arranged in a pole-center side of said magnetic pole; and a magnetic flux generated from said permanent magnet arranged in the between-pole side of said magnetic pole approximately equals a magnetic flux generated from said permanent magnet arranged in the pole-center side of said magnetic pole.

10. A permanent magnet rotating electric machine, comprising:

a stator; and a rotor rotatably arranged with a predetermined gap relative to said stator; wherein, said stator comprises a stator core having a plurality of slots, and multi-phase stator windings inserted into said plurality of slots;

said rotor comprises a rotary shaft, a rotor core provided on said rotary shaft, and a plurality of permanent magnets embedded internally into said rotor core;

said rotor core comprises a plurality of laminated steel sheets, on which a plurality of holes are formed to form a plurality of permanent-magnet-inserting holes, such that said plurality of permanent-magnet-inserting holes are arranged in parallel to said rotary shaft;

a plurality of magnetic poles are formed by inserting said permanent magnets into said permanent-magnet-inserting holes;

each of said plurality of magnetic poles is configured by a group of said permanent magnets;

the group of said permanent magnets configuring each of said plurality of magnetic poles are inserted into said permanent-magnetic-inserting holes and arranged within said rotor core so that said permanent magnets are parallel to said rotary shaft; and the group of said permanent magnets configuring each of said plurality of magnetic poles are arranged symmetrically with respect to a rotation direction of said rotor, but not symmetrically with respect to a longitudinal direction of said rotor.

11. The permanent magnet rotating electric machine according to claim 10, wherein:

a group of said permanent magnets configuring each of said plurality of magnetic poles includes a permanent magnet arranged in a between-pole side of said magnetic pole, and a permanent magnet arranged in a pole-center side of said magnetic pole; and a ratio between a length of the permanent magnet arranged in the between-pole side of said magnet pole in a longitudinal direction of said rotor and a length of the permanent magnet arranged in the pole-center side of said magnet pole in a longitudinal direction of said rotor is 1:1.

12. The permanent magnet rotating electric machine according to claim 10, wherein:

a group of said permanent magnets configuring each of said plurality of magnetic poles includes a permanent magnet arranged in a between-pole side of said magnetic pole, and a permanent magnet arranged in a pole-center side of said magnetic pole; and when an angle subtended by said permanent-magnetic-inserting hole, in which said permanent magnet arranged in the between-side of said magnetic pole is inserted, about a pole center is $\theta$ an angle subtended by said permanent-magnet-inserting hole, in which said permanent magnet arranged in the pole-center side of said magnetic pole is inserted, about said pole center is $\phi$, and a pitch of said slot is $\tau s$, $\theta$ satisfies a relation $$\theta = (n+0.5) \times \tau s + \phi \text{(where, } n \text{ is an integer)}.$$

13. The permanent magnet rotating electric machine according to claim 10, wherein:

a group of said permanent magnets configuring each of said plurality of magnetic poles includes a permanent magnet arranged in a between-pole side of said magnetic pole, and a permanent magnet arranged in a pole-center side of said magnetic pole; and a magnetic flux generated from said permanent magnet arranged in the between-pole side of said magnetic pole approximately equals a magnetic flux generated from said permanent magnet arranged in the pole-center side of said magnetic pole.

14. A permanent magnet rotating electric machine, comprising:

a stator; and a rotor rotatably arranged with a predetermined gap to said stator, wherein, said stator comprises a stator core having a plurality of slots, and a multi-phase stator windings inserted into said plurality of slots;

said rotor comprises a rotary shaft, a rotor core provided on said rotary shaft, and a plurality of permanent magnets embedded internally into said rotor core;

a plurality of permanent-magnet-inserting holes and a plurality of magnetic poles configured by said plurality of permanent magnets are formed on said rotor core;

each of said plurality of magnetic poles is configured by a group of said permanent magnets;

said plurality of permanent-magnet-inserting holes are provided to embed said permanent magnets internally into said rotor core and are formed parallel to said rotary shaft;

the group of said permanent magnets configuring each of said plurality of magnetic poles are inserted into said permanent-magnet-inserting holes and arranged within said rotor core so that said permanent magnets are parallel to said rotary shaft;

the group of said permanent magnets configuring each of said plurality of magnetic poles are arranged symmetrically with respect to a rotation direction of said rotor but not symmetrically with respect to a longitudinal direction of said rotor;

each of said multi-phase stator windings is composed of three phases, including a U phase, a V phase, and a W phase; and said slot corresponding to each of the U phase, the V phase, and the W phase of said stator windings is opposed to each of said magnetic poles.

15. The permanent magnet rotating electric machine according to claim 14, wherein:

a group of said permanent magnets configuring each of said plurality of magnetic poles includes a permanent magnet arranged in a between-pole side of said magnetic pole, and a permanent magnet arranged in a pole-center side of said magnetic pole; and a ratio between a length of the permanent magnet arranged in the between-pole side of said magnet pole in a longitudinal direction of said rotor and a length of the permanent magnet arranged in the pole-center side of said magnet pole in a longitudinal direction of said rotor is 1:1.

16. The permanent magnet rotating electric machine according to claim 14, wherein:

a group of said permanent magnets configuring each of said plurality of magnetic poles includes a permanent magnet arranged in a between-pole side of said magnetic pole, and a permanent magnet arranged in a pole-center side of said magnetic pole; and when an angle of subtended by said permanent-magnet-inserting hole, in which said permanent magnet arranged in the between-pole side of said magnetic pole is inserted, about a pole center is $\phi$, and a pitch of said slot is $\tau s$, $\theta$ satisfies a relation $$\theta=(n+0.5)\times\tau s+\phi \text{(where, } n \text{ is an integer)}.$$

17. The permanent magnet rotating electric machine according to claim 14, wherein:

a group of said permanent magnets configuring each of said plurality of magnetic poles includes a permanent magnet arranged in a between-pole side of said magnetic pole, and a permanent magnet arranged in a pole-center side of said magnetic pole; and a magnetic flux generated from said permanent magnet arranged in the between-pole side of said magnetic pole approximately equals a magnetic flux generated from said permanent magnet arranged in the pole-center side of said magnetic pole.

18. A permanent magnet rotating electric machine, comprising:

a stator; and a rotor rotatably arranged with a predetermined gap to said stator; wherein, said stator comprises a stator core having a plurality of slots, and multi-phase stator windings inserted into said plurality of slots;

said rotor comprises a rotary shaft, a rotor core provided on said rotary shaft, and a plurality of permanent magnets embedded internally into said rotor core;

said rotor core comprises a plurality of laminated steel sheets, on which a plurality of holes are formed to form a plurality of permanent-magnet-inserting holes, such that said plurality of permanent-magnet-inserting holes are arranged in parallel to said rotary shaft;

a plurality of magnetic poles are formed by inserting said permanent magnets into said permanent-magnet-inserting holes;

each of said plurality of magnetic poles is configured by a group of said permanent magnets;

the group of said permanent magnets configuring each of said plurality of magnetic poles are inserted into said permanent-magnet-inserting holes and arranged within said rotor core so that said permanent magnets are parallel to said rotary shaft;

the group of said permanent magnets configuring each of said plurality of magnetic poles are arranged symmetrically with respect to a rotation direction of said rotor but not symmetrically with respect to a longitudinal direction of said rotor;

said multi-phase stator windings are each composed of three phases, that is, a U phase, a V phase, and a W phase; and said slot corresponding to each of the U phase, the V phase, and the W phase of said stator windings is opposed to each of said magnetic poles.

19. The permanent magnet rotating electric machine according to claim 18, wherein:

a group of said permanent magnets configuring each of said plurality of magnetic poles includes a permanent magnet arranged in a between-pole side of said magnetic pole, and a permanent magnet arranged in a pole-center side of said magnetic pole; and a ratio between a length of the permanent magnet arranged in the between-pole side of said magnet pole in a longitudinal direction of said rotor and a length of the permanent magnet arranged in the pole-center side of said magnet pole in a longitudinal direction of said rotor is 1:1.

20. The permanent magnet rotating electric machine according to claim 18, wherein:

a group of said permanent magnets configuring each of said plurality of magnetic poles includes a permanent magnet arranged in a between-pole side of said magnetic pole, and a permanent magnet arranged in a pole-center side of said magnetic pole; and when an angle subtended by said permanent-magnet-inserting hole, in which said permanent magnet arranged in the between-pole side of said magnetic pole is inserted, about a pole center is $\theta$, an angle subtended by said permanent-magnet-inserting hole, in which said permanent magnet arranged in the pole-center side of said magnetic pole is inserted, about said pole center is $\phi$, and a pitch of said slot is $\tau s$, said $\theta$ satisfies a relation $$\theta=(n+0.5)\times\tau s+\phi \text{(where, } n \text{ is an integer)}.$$

21. The permanent magnet rotating electric machine according to claim 18, wherein:

a group of said permanent magnets configuring each of said plurality of magnetic poles includes a permanent magnet arranged in a between-pole side of said magnetic pole, and a permanent magnet arranged in a pole-center side of said magnetic pole; and a magnetic flux generated from said permanent magnet arranged in the between-pole side of said magnetic pole approximately equals a magnetic flux generated from said permanent magnet arranged in the pole-center side of said magnetic pole.

* * * * *